United States Patent [19]
Desvignes et al.

[11] 3,952,208
[45] Apr. 20, 1976

[54] DEVICE FOR CONTROLLING THE POSITION OF A FIRST BODY RELATIVE TO THAT OF A SECOND BODY

[75] Inventors: Francois Desvignes, Bourg-la-Reine (Seine); Marcel Georges Hebert, Paris, both of France

[73] Assignee: U.S. Philips Corporation, New York, N.Y.

[22] Filed: Feb. 1, 1974

[21] Appl. No.: 438,658

[30] Foreign Application Priority Data
Feb. 2, 1973  France .............................. 73.03744

[52] U.S. Cl. ........................... 250/578; 250/203 R; 250/209; 356/4; 244/3.16
[51] Int. Cl.² ...................................... H01J 39/12
[58] Field of Search .......... 250/203, 347, 234, 578, 250/216, 208, 209; 356/4; 244/3.16, 3.21

[56] References Cited
UNITED STATES PATENTS

| | | | |
|---|---|---|---|
| 3,353,022 | 11/1967 | Schwartz | 356/4 |
| 3,535,521 | 10/1970 | Levine | 250/203 X |
| 3,790,276 | 2/1974 | Cook et al. | 250/203 X |

*Primary Examiner*—Walter Stolwein
*Attorney, Agent, or Firm*—Frank R. Trifari; Bernard Franzblau

[57] ABSTRACT

An accurate and reliable device for controlling the position of a first body, of which the devices forms part, relative to a second body is described. The edge of the image of the second body is periodically moved over a row of radiation-sensitive detectors in a manner such that at most two detectors receive modulated radiation.

16 Claims, 4 Drawing Figures

DEVICE FOR CONTROLLING THE POSITION OF A FIRST BODY RELATIVE TO THAT OF A SECOND BODY

The present invention relates to a device for controlling the position of a first body relative to the position of a second body, which device forms part of the first body and comprises a periodically moving mirror, an objective system for forming a periodically moving image of the second body on a radiation-sensitive detector system and an electronic circuit arrangement for processing the detector signal so as to produce a position indication.

The invention is particularly useful for controlling the attitude of an artificial satellite relative to the earth.

In most uses of satellites the earth is to be observed and a high density of communications with ground-based transmitter receivers is required; typically telecommunication satellites are concerned. It then is of importance that the transmitter-receivers have maximum transmission capacity with minimum power consumption, that is to say that they use transmitting and receiving antennae having lobes of small aperture angle. This condition necessitates the use of geostationary satellites, that is to say satellites which in a period of 24 hours describe a circular orbit over the equator at a distance of 42,200 km from the centre of the earth. To permit full advantage to be taken of the steadily improving means of telecommunication the antennae have to be ever more highly directive. Hence instruments of a higher degree of accuracy are required to control the attitude of the satellite. Three different motions of the satellite relative to the earth are possible, viz. rolling, pitching and yawing.

The solar radiation reflected by the earth varies from hour to hour. In order to avoid the troublesome effects of these variations and to enable attitude control to be performed both during the day and at night, radiation of a wavelength of more than 6 microns must be used. The radiation emitted by the earth itself varies very little during the day. To prevent interference by clouds, preferably only radiation having a wavelength between 14 and 16 microns is used which is emitted by carbon dioxide at a height above about 20 km.

At present two different devices for attitude control of a satellite are known. In a first device an objective produces an image of the earth on a plurality of thermal detectors. The detectors are arranged in pairs, one detector of a pair being disposed opposite the other one on different sides of the centre of the image of the earth. The output signals from opposed detectors are of opposite polarity. The difference between the output signals from the two detectors is an analog function of the angular deviation about the axis of symmetry which joins the two thermal detectors. In a second device a plane mirror oscillates about an axis which extends at right angles to the line to the centre of the earth. The mirror reflects the radiation emanating from the earth to a germanium objective. A detector sensitive to infra-red radiation, for example a bolometer or a pyroelectric detector, is placed at the focal point of the objective. By determining the positions of the mirror which correspond to the instants at which the bolometer indicates that the earth horizon moves over it, for example by means of a coded disk, the attitude of the device relative to the axis which extends parallel to the rotation axis can be determined.

The said two devices each have an advantage and a disadvantage. The first device is purely static and contains no moving parts, which is of advantage with respect to reliability. In this device directvoltage measurements have to be made. The influence on the measurements of the heavy thermal stresses to which space equipment is subjected will, however, be great. In the second device measurements are made by dynamic means so that the influence of the thermal stresses is much smaller. It would appear however that the reliability is lower owing to the comparatively high frequency and the large amplitude of the movements the mirror has to perform during the entire working life of the device.

A more fundamental difficulty, which becomes evident only after careful investigation, is that neither of the two devices can be constructed so as to combine a large field of view with a high degree of accuracy. This is due to the fact that the infra-red radiation from the earth, even in the wavelength band of 14 to 16 microns, is not uniform. Thus it has proved very difficult to design a device which combines an accuracy better than 0.05° with a field of view exceeding 1°. Such a device is much more complicated and less reliable than the devices used so far.

It is an object of the invention to provide a device of the oscillating-mirror type of increased reliability and simple structure. For this purpose the device according to the invention is characterized in that the detector system comprises at least one row of radiation-sensitive detectors which, in the direction of movement of the image, have dimensions and relative spacings such that the movement of the image of the second body covers at most two detectors.

The invention will now be described more fully with reference to its use in an artificial satellite, reference being made to the accompanying diagrammatic drawings, in which.

The use of the invention is not restricted to controlling the attitude of an artificial satellite relative to the earth. In fact, the invention may generally be used for controlling the changes in position of a first body relative to that of a second body used as a reference.

Figure 1:
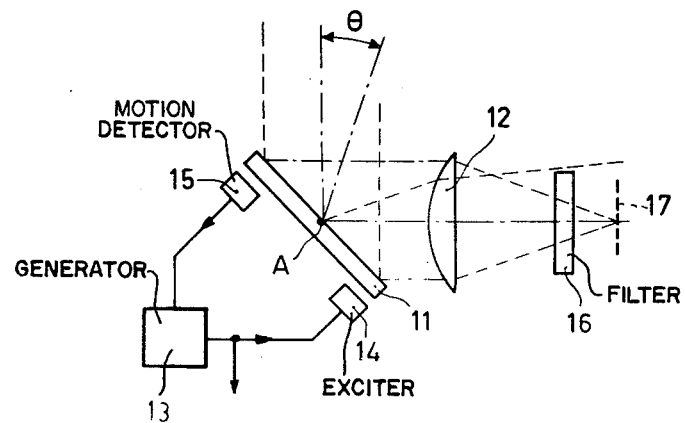
FIG. 1 shows schematically an optical system according to the invention.

Referring now to FIG. 1, the device shown includes a plane mirror 11 which oscillates about an axis A. The mirror 11 reflects the radiation emitted by the earth to an objective 12. The apparent diameter of the earth is 20. Oscillation of the mirror is maintained by magnetic, piezoelectric or even electrostatic driving means. In general these means comprise a generator 13 and an exciter 14. A motion detector 15 ensures that the generator 13 produces the required oscillation frequency.

The ray beam issuing from the objective passes through a filter 16 (the function of which is to optimize the definition of the outlines of the image formed) before reaching a composite radiation-sensitive detector 17. In the embodiment shown the detector comprises a plurality of detectors arranged in a line at right angles to the axis of oscillation of the mirror. The detectors are disposed so that when the attitude of the satellite relative to the earth is correct the edge of the image formed by the objective, for example the image of the earth-space transition, moves over the detectors substantially at right angles thereto.

Figure 2:
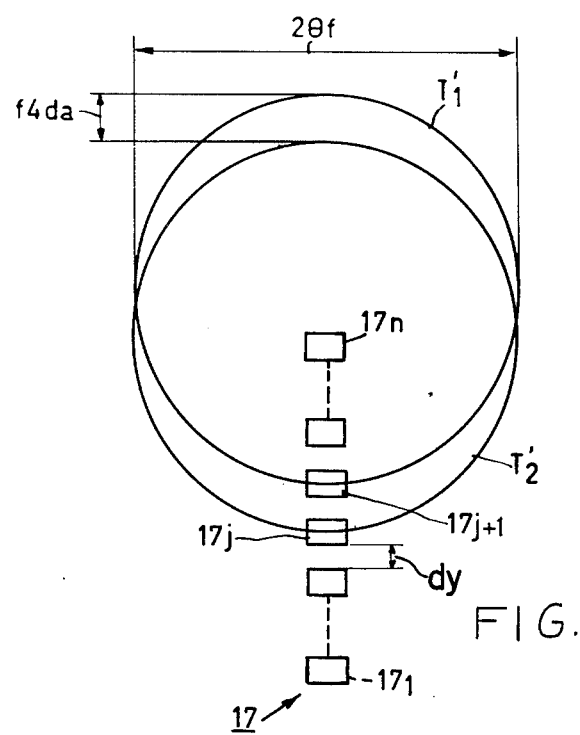
FIG. 2 illustrates the operation of the system.

FIG. 2 is a plan view of the row of detectors. The composite detector comprises $n$ detectors $17_1$ to $17_n$ the relative spacing $dy$ of which is determined by the dimensions of a detector which, as will be set forth below, define the resolution of the measuring system.

If it is assumed that:

$2\theta$ is the apparent diameter of the earth, $f$ is the focal distance of the objective, $dy$ is the relative spacing of the $n$ detectors, the row of detectors is orientated in the manner shown in FIGS. 1 and 2, i.e. the image of the edge of the earth moves over the row substantially at right angles thereto, and that the intention is that a single detector ($17_j$) or at most two detectors ($17_j$ and $17_{j+1}$) receive modulated radiation, then the oscillation amplitude ($da$) of the mirror is given by $$da = dy/4f.$$

The modulation is produced by the periodic deflection of the image of the earth-space transition over the detectors. This modulation is in synchronism with the mirror motion.

The above shows that the scanned field is independent of the oscillation amplitude of the mirror. This field is determined only by the length of the row of detectors. Furthermore the amplitude of oscillation of the mirror is very small. It is determined by the relative spacing of the detectors and hence by the dimensions thereof.

It will be clear that if the row of detectors assumes another direction relative to the axis of oscillation of the mirror in the plane of the row, the oscillation amplitude of the mirror is given by $$da = \frac{dy}{4f.x}$$

where $x$ is a function of the angle enclosed by the oscillation axis of the mirror and the direction of orientation of the row of detectors. If this angle is $\alpha$, then $x$ is equal to $\sin \alpha$.

The device according to the invention may also be used outside the field of satellite sighting systems. The image formed by the objective may have an arbitrary geometrical shape and its outlines may make an arbitrary angle with the oscillation axis of the mirror, while the direction of the row of detectors relative to this axis may be arbitrary. Any one skilled in the art can readily compute the amplitude at which the mirror is to oscillate.

In practice the row 17 may comprise 30 bolometers of rectangular shape: 0.26 mm by 1.04 mm. The relative spacing of the detectors then is equal to 0.26 mm. This spacing corresponds to 0.52 milliradian or about 0.03° in the object space. With the 30 bolometers a field of 0.9° can be scanned. The focal distance of the objective may be chosen to be 0.5 m. The amplitude of the oscillating motion of the mirror then is of the order of 0.01°. Thus the object of the invention is attained: the mirror motion is restricted to a movement having an amplitude of the order of microns, resulting in high reliability of the system.

Figure 3:
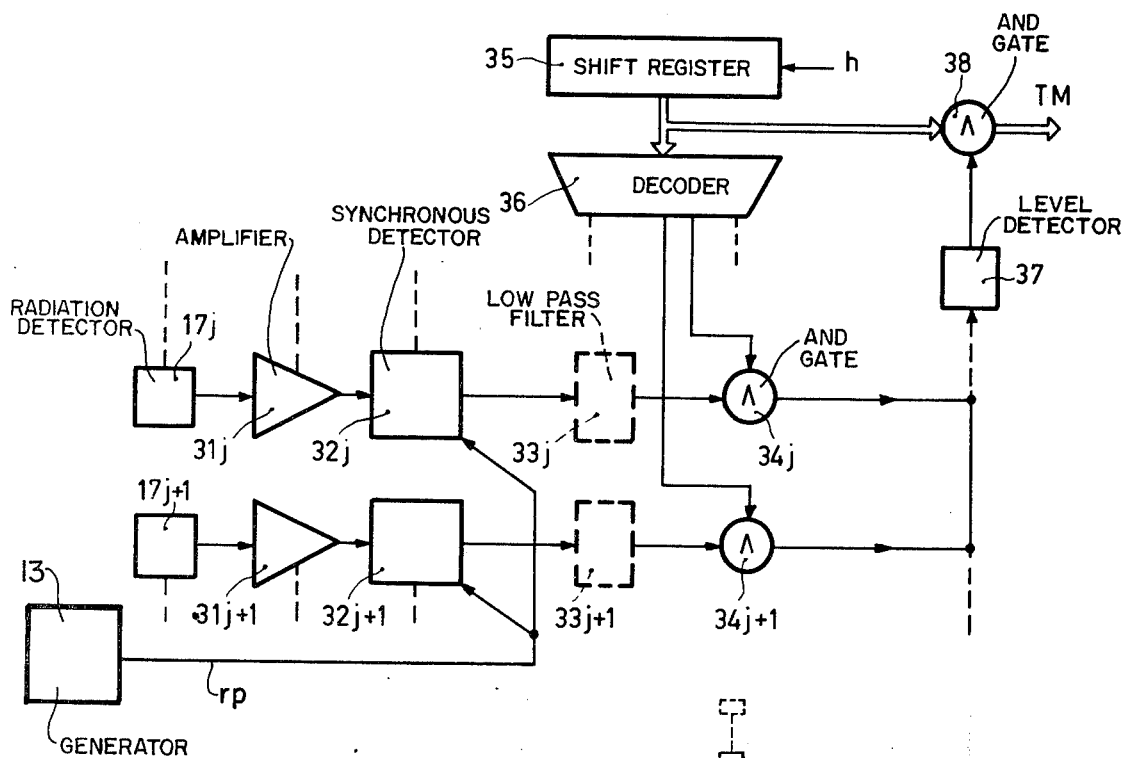
FIG. 3 shows an electronic circuit arrangement for processing the signals from the system.

FIG. 3 is a block-schematic circuit diagram of an embodiment of an electronic processing circuit.

Each detector, such as $17_j$, $17_{j+1}$, of the row of detectors is connected to an alternating-current amplifier, such as $31_j$ and $31_{j+1}$ respectively, which raises the signal to a level sufficient for further processing. Each amplifier may include a filter having a comparatively narrow passband about the oscillation frequency of the mirror.

Each alternating-current amplifier is connected to a synchronous electronic detector, such as $32_j$ and $31_{j+1}$ respectively, the phase reference $rp$ of which is provided by the generator 13 which also maintains the mirror in motion.

As pointed out above, the image of the edge of the earth is received by one or at most two radiation-sensitive detectors, this detector or each of these detectors then producing a modulated output signal which is in phase with the oscillatory motion of the mirror. If the phase reference for the elements $31_j$, $31_{j+1}$ is supplied by the generator 13, output signals will be supplied from only that electronic detector or those two electronic detectors which are associated with a radiation-sensitive detector which periodically receives the image of the edge of the earth.

Each synchronous detector is connected to one of the two inputs of an AND gate such as $34_j$ and $34_{j+1}$, possibly through a low-pass filter such as $33_j$ and $33_{j+1}$ respectively, which reduces the fluctuations due to the noise of the radiation-sensitive detector and of the amplifier.

The AND gates connected to the electronic detectors each have two inputs and are successively opened by clock pulses $h$ which are applied to a shift register 35. The shift register is connected to a selective decoder 36 having the $n$ outputs each of which are connected to the second input of one of the $n$ AND gates such as $34_j$ and $34_{j+1}$.

The outputs of the $n$ AND gates are connected to the inputs of a level detector 37 which is adjusted so as to deliver an output signal when the value of the voltage at its input corresponds to that of a signal supplied by a synchronous electronic detector when the radiation-sensitive detector associated with the electronic detector receives the periodically deflected image of the edge of the earth.

The output signal from the level detector is applied to the control input of an AND gate 38 to the other input of which the various sets of contents of the shift register are successively applied. As a result there appears at the output of the AND gate 38 a telemetry signal TM in digital form which corresponds to the serial number of the radiation-sensitive detector (or of each of the two detectors) which receive(s) the image of the edge of the earth.

A practical embodiment of a device according to the invention had the following features:

the oscillation frequency of the mirror was 10 Hz. With the amplitude selected of the order of 0.01° this provides no difficulty in respect of the long-term reliability for a robust deflection mechanism, the objective was a Cassegrain system having a diameter of 7 cm, an entrance pupil of 38.5 cm², a transmission coefficient of 0.8 and a focal distance of 0.5 m, the filter had a transmission coefficient of 0.8, the device can be used for radiation having wavelengths from 9 to 25 μm,
the frequency of the clock pulses h was 60Hz.
The resulting performance then is:
response of a bolometer: 4. $10^{-6}$ V eff,
accuracy: 0.05°.

The abovedescribed device provides information about the deviation about one axis, for example the axis about which rolling occurs or that about which pitching occurs. It may be necessary to obtain information about deviations about two axes (rolling and pitching). This information can be obtained:

by using two rows of radiation-sensitive detectors at right angles to one another, and by causing the mirror to move about two axes of oscillation at right angles to one another.

Figure 4:
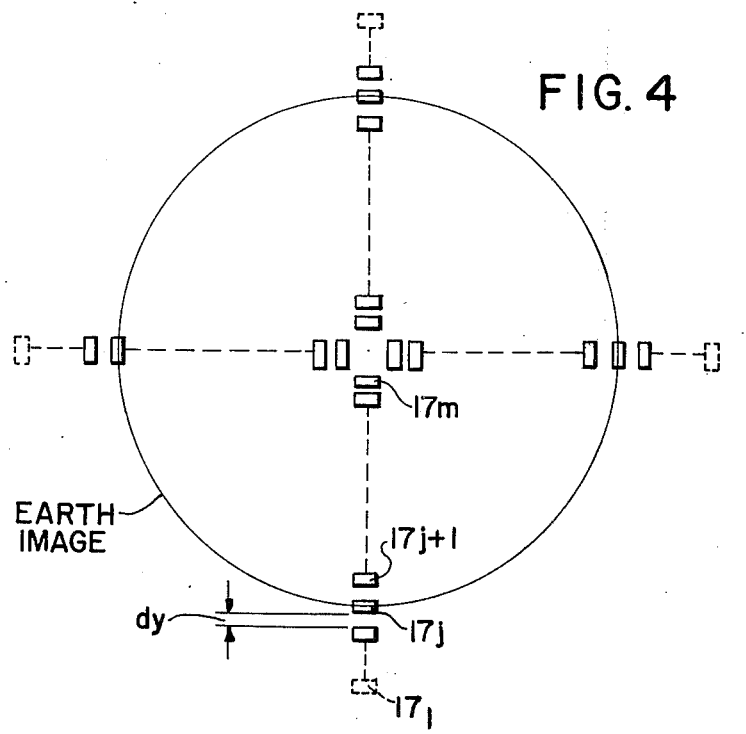
FIG. 4 shows an alternative arrangement of the detectors providing two-axis information.

It is also possible to use four rows of radiation-sensitive detectors (FIG. 4) which in pairs are arranged in two directions at right angles to one another so that the image of the earth-space transition moves over the detectors. The image is periodically deflected in synchronism with the motion of an oscillating mirror. The oscillation axis of the mirror is at an angle of 45° to the directions of the rows of detectors.

The above described device is only an exemplary embodiment of a device according to the invention. Modifications thereof, in particular concerning the motion of the mirror, the number and the directions of the rows of detectors and the details of the electronic processing circuit, may be used without departing from the scope of the invention.

What is claimed is:

1. A device providing position information of a first body relative to the position of a second body, said device forming a part of the first body and comprising, a radiation sensitive detector system including a plurality of radiation sensitive detectors arranged in a row, a mirror pivotally mounted for periodic oscillation about an axis at a constant amplitude and frequency and located to receive radiation energy from the second body, an objective system positioned in the path of the radiation energy reflected by the mirror for forming a periodically moving radiation image of the second body on a part of the radiation sensitive detector system, and an electronic circuit for processing a detector signal derived by the radiation sensitive detector system in response to said radiation image thereby to produce a position indication, said row of radiation sensitive detectors being aligned in a direction parallel to the direction of periodic movement of the radiation image and with the detector dimensions, the spacing between detectors and the oscillation amplitude of the mirror being related such that the radiation image of the second body is oscillated over a maximum of two radiation detectors.

2. A device as claimed in claim 1 wherein the row of detectors are aligned in a direction perpendicular to the oscillation axis of the pivotable mirror whereby the radiation image of the second body oscillates across the row of detectors in a direction parallel thereto.

3. A device as claimed in claim 1 further comprising means for periodically oscillating the mirror with a constant amplitude directly proportional to the spacing between radiation sensitive elements and inversely proportional to the focal distance of the objective system.

4. A device as claimed in claim 1 wherein the amplitude da of the oscillatory movement of the mirror is given by $$da = \frac{dy}{4fx}$$

where
dy is the relative spacing of the detectors,
f is the focal distance of the objective system, and
x is a function of the angle enclosed by the oscillation axis of the mirror and the direction of the row of detectors.

5. A device as claimed in claim 1 wherein the radiation-sensitive detector system comprises two rows of radiation-sensitive detectors which extend at right angles to one another, the mirror oscillating about two axes each parallel to the direction of one of the rows.

6. A device as claimed in claim 1 wherein the radiation-sensitive detector system comprises four rows of radiation-sensitive detectors which rows are arranged in pairs at right angles to one another, the mirror oscillating about an axis which is at an angle of 45° to the directions of the rows of detectors.

7. A device as claimed in claim 4 wherein the radiation-sensitive detector system comprises two rows of radiation-sensitive detectors which extend at right angles to one another, the mirror oscillating about two axes each parallel to the direction of one of the rows.

8. A device as claimed in claim 4 wherein the radiation-sensitive detector system comprises four rows of radiation-sensitive detectors which rows are arranged in pairs at right angles to one another, the mirror oscillating about an axis which is at an angle of 45° to the directions of the rows of detectors.

9. Apparatus for providing position information of a first body with respect to a reference body comprising, a plurality of radiation sensitive elements arranged in a row, a mirror mounted for oscillation about an axis to scan and receive radiation energy from the reference body, means for periodically oscillating the mirror about said axis, an objective system positioned to receive radiation energy reflected by the mirror for forming a periodically moving image of the reference body on given ones of said elements, the dimensions and relative spacing of said elements being chosen so that, in the direction of periodic movement of the image, the movement of the image of the reference body extends over a maximum of two of said elements during each oscillation cycle of the mirror, and electronic means coupled to the output of said elements for processing the signals derived therein so as to produce a position information signal indicative of the position of the first body relative to the reference body.

10. Apparatus as claimed in claim 9 wherein said electronic processing means comprises, means for generating a reference signal in timed relation to the periodic mirror oscillation, and means coupled to said elements and to said reference signal generating means for comparing the output signals of the elements with the reference signal to produce a position information signal.

11. Apparatus as claimed in claim 10 wherein said comparing means comprises a plurality of synchronous detectors each coupled individually to the output of a radiation sensitive element and to said reference signal generating means to derive a plurality of position information signals, and said electronic processing means further comprises gating means for selectively passing the information signals in a manner such that the signals derived from each element are identified.

12. Apparatus as claimed in claim 9 wherein said mirror oscillating means is adjusted so that the amplitude of the mirror oscillation is directly proportional to the relative spacing between the radiation sensitive elements and is inversely proportional to the focal distance of the objective system and to a function of the angle enclosed by the mirror oscillation axis and the direction of the row of elements.

13. Apparatus as claimed in claim 9 wherein the elements are arranged in a line perpendicular to the mirror oscillation axis whereby the edge of the image of the reference body scans across the row of elements substantially at right angles thereto and wherein the amplitude of the mirror oscillation is directly proportional to the relative spacing between the radiation sensitive elements and is inversely proportional to the focal distance of the objective system.

14. Apparatus as claimed in claim 9 wherein said elements are responsive to radiation having wavelengths between 9 and 25 microns and wherein the amplitude $da$ of the mirror oscillation is given by:

$$da = \frac{dy}{4fx}$$

where $dy$ is the relative spacing between the detectors, $f$ is the focal distance of the objective system, and $x$ is a function of the angle formed by the mirror oscillation axis and the direction of the row of elements.

15. Apparatus as claimed in claim 9 wherein said oscillating means is arranged to oscillate the mirror so that the periodic movement of the image is parallel to the direction of the row of elements.

16. Apparatus as claimed in claim 15 wherein the oscillating means oscillates the mirror at a constant amplitude and frequency and the oscillation amplitude is determined by the spacing between the radiation sensitive elements and the focal distance of the objective system.

* * * * *